United States Patent [19]
Ueda et al.

[11] Patent Number: 5,187,758
[45] Date of Patent: Feb. 16, 1993

[54] METHOD OF FABRICATING OPTICAL SWITCH

[75] Inventors: Masanori Ueda, Kawasaki; Hisashi Sawada, Inagi; Akira Tanaka; Noboru Wakatsuki, both of Kawasaki, all of Japan

[73] Assignee: Fujitsu Limited, Kawasaki, Japan

[21] Appl. No.: 730,721

[22] Filed: Jul. 16, 1991

[30] Foreign Application Priority Data

Jul. 17, 1990 [JP] Japan ............................. 2-187235
Sep. 19, 1990 [JP] Japan ............................. 2-249353

[51] Int. Cl.⁵ .......................... G02B 6/00; G02B 6/36
[52] U.S. Cl. ........................................................ 385/16
[58] Field of Search .............. 350/96.13, 96.14, 96.15, 350/96.20, 96.21, 96.22; 385/16-23

[56] References Cited

U.S. PATENT DOCUMENTS

| 4,303,302 | 12/1981 | Ramsey et al. | 350/96.2 |
| 4,452,507 | 6/1984 | Winzer | 385/21 |
| 4,568,143 | 2/1986 | Yamada et al. | 350/96.2 |
| 4,699,457 | 10/1987 | Goodman | 350/96.2 |
| 4,911,520 | 3/1990 | Lee | 350/96.2 |
| 4,948,223 | 8/1990 | Anderson et al. | 350/96.2 |
| 4,950,887 | 8/1990 | Hughes et al. | 250/227.21 |

FOREIGN PATENT DOCUMENTS

| 0098816 | 1/1984 | European Pat. Off. . | |
| 0256348 | 2/1988 | European Pat. Off. | 350/96.13 |
| 53-156903 | 12/1983 | Japan . | |
| 2-43514 | 2/1990 | Japan . | |
| 2176023 | 12/1986 | United Kingdom | 350/96.2 |

*Primary Examiner*—Akm E. Ullah
*Attorney, Agent, or Firm*—Armstrong, Westerman, Hattori, McLeland & Naughton

[57] ABSTRACT

A method of fabricating an optical switch including a stationary support member, a movable support member, and at least one pair of optical fibers, the pair of optical fibers being supported on the stationary and movable support members, respectively, so that an optical path between optical fibers is changed by moving the movable support member. The method comprises the steps of preparing a guide with V-shaped grooves, securing at least one optical fiber element on the surface of the guide, bridging and fixing the guide on the stationary and movable support members, and separating the guide along at least a line extending between the stationary and movable support members. Thus, the guide and the optical fiber element is separated into a first part supported by the stationary support member and a second part supported by the movable support member, to constitute the optical switch having at least one pair of optical fibers.

17 Claims, 9 Drawing Sheets

METHOD OF FABRICATING OPTICAL SWITCH

BACKGROUND OF THE INVENTION

1. Field of the Invention

The present invention relates to a method of fabricating an optical switch for changing optical paths of optical fibers and an optical switch.

2. Description of the Related Art

Due to the current developments in communication systems such as an optical LAN (local area network), an optical switch having a low transfer loss and a high switching rate is urgently required.

A known optical switch comprises a stationary support member, a movable support member, and at least one pair of optical fibers having end surfaces, respectively; one of the optical fibers being supported on the stationary support member and the other of the optical fibers being supported on the movable support member so that the respective one end surfaces of the optical fibers face each other to form an optical path therebetween, and the optical path between the optical fibers is changed by moving the movable support member relative to the stationary support member.

In the fabrication of the above-described optical switch, an end portion of one of the optical fibers is fixed to the stationary support member by an adhesive and the other optical fiber is fixed to the movable support member by an adhesive, so that the end portion of one optical fiber must face the end portion of the other optical fiber and be aligned therewith. In an optical switch having a plurality of pair of optical fibers, for forming and changing a plurality of optical paths, a plurality of optical fibers must be fixed to the stationary and movable support members by an adhesive, respectively, and end portions of each pair of optical fibers must face and be aligned with each other, but the fixing of the optical fibers to the stationary and movable support members so that the end portions of each pair of optical fibers are aligned is difficult.

SUMMARY OF THE INVENTION

The object of the present invention is to provide a method of fabricating an optical switch in which facing optical fibers can be fixed to stationary and movable support members so that end portions of the optical fibers are easily and reliably aligned with each other.

According to the present invention, there is provided a method of fabricating an optical switch including a stationary support member, a movable support member, and at least one pair of optical fibers having end surfaces, respectively, one of the optical fibers being supported on the stationary support member and the other of said optical fibers being supported on the movable support member so that the respective one end surfaces of the optical fibers face each other to form an optical path therebetween, and the optical path between the optical fibers is changed by moving the movable support member relative to the stationary support member, the method comprising the steps of: preparing guide means having a straight axis and a surface extending in parallel to the axis; securing at least one optical fiber element on the surface of the guide means; bridging the guide means between the stationary and movable support members and fixing the guide means on the stationary and movable support members; and separating the guide means along at least a line extending between the stationary and movable support members so that the optical fiber element is separated along that line into a first part supported by the stationary support member and a second part supported by the movable support member, the first and second parts of the separated optical fiber element constituting the at least one pair of optical fibers having the respective end surfaces thereof facing each other.

Preferably, the step of preparing the guide means includes forming at least one V-shaped straight groove on the surface of the guide means, and the optical fiber element is secured in the V-shaped groove.

In the step of securing the optical fiber element to the surface of the guide means having the straight axis, the optical fiber element is fixed linearly to the guide means. Accordingly, when the optical fiber element is separated into first and second parts, these separated parts are automatically aligned on the guide means which forms a bridge between the stationary and movable support members, and constitutes the one pair of optical fibers. The end surfaces of the optical fibers are separated by cutting the optical fiber element with a dicing saw.

In one aspect, the separating step is carried out by cutting the guide means and the optical fiber element after the guide means is bridged and fixed to the stationary and movable support members.

In another aspect, the separating step is carried out twice; before and after the guide means is bridged and fixed on the stationary and movable support members. In this case, the method further includes the step of partly cutting the guide means along the line on the side of the surface of the guide means so that the optical fiber element is completely cut but a portion of the guide means remote from the surface remains uncut, after the step of securing the at least one optical fiber element on the surface of the guide means and before the step of bridging the guide means between the stationary and movable support members, and the step of the separating the guide means comprises separating the uncut portion of the guide means along the line.

Preferably, in the latter case, the step of preparing the guide means includes preparing a first guide plate having first and second surfaces and at least one V-shaped straight groove on the first surface thereof, and a second guide plate having first and second surfaces with the first surface of the second guide plate attached to the second surface of the first guide plate, the at least one optical fiber element being secured in the at least one V-shaped groove.

The last separation can be carried out by a laser cutting, and in this case, the second guide plate is made from a material which is easier to cut than a material of the first guide plate.

Alternatively, the last separation can be carried out chemically, and in this case, the second guide plate is attached to the first guide plate by a soluble hardening agent. The step of partly cutting the guide means along the line is carried out such that the first guide plate and the optical fiber element is generally completely cut but the second guide plate remains substantially uncut, and the step of the separating the guide means along the line is carried out by applying a liquid to said second guide plate to dissolve the soluble hardening agent, to thereby allow the second guide plate to be separated from the first guide plate fixed to the stationary and movable support members.

Further, there is provided an optical switch which can be fabricated according to the above-described methods of the present invention, and which comprises a stationary support member, a movable support member, at least one pair of optical fibers having end portions and end surfaces, respectively, a first guide covering the end portion of one of the optical fibers against the stationary support member to fix one of the optical fibers on the stationary support member, and a second guide covering the end portion of the other of the optical fibers against the movable support member to fix the other optical fiber on the movable support member, whereby the respective one end surfaces of the optical fibers face each other to form an optical path therebetween, and the optical path between the optical fibers is changed by moving the movable support member relative to the stationary support member.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
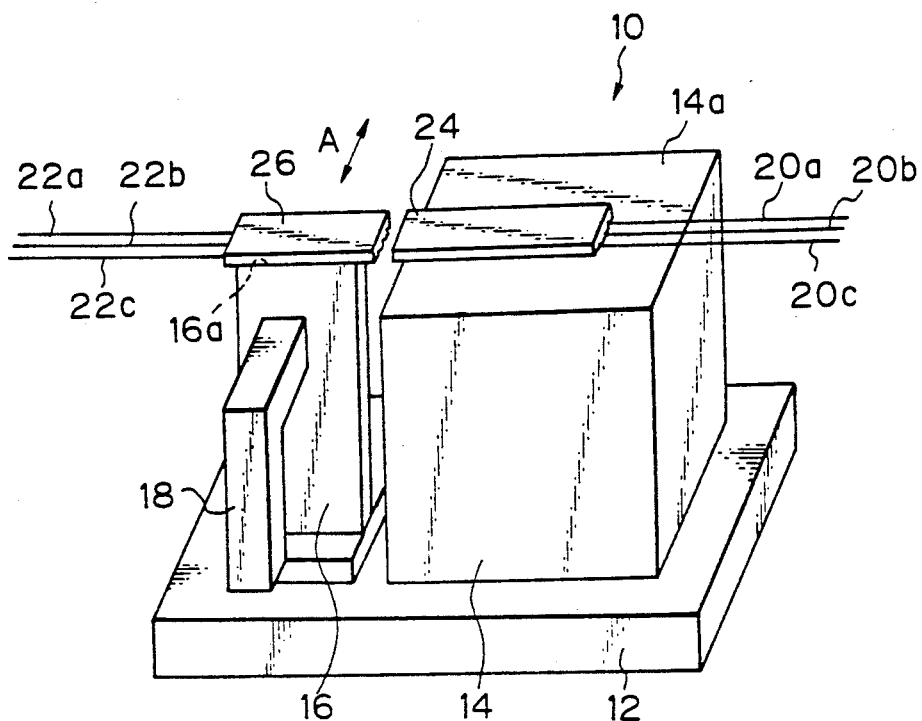
FIG. 1 is a perspective view of an optical switch according to the first embodiment of the present invention.
Figure 2:
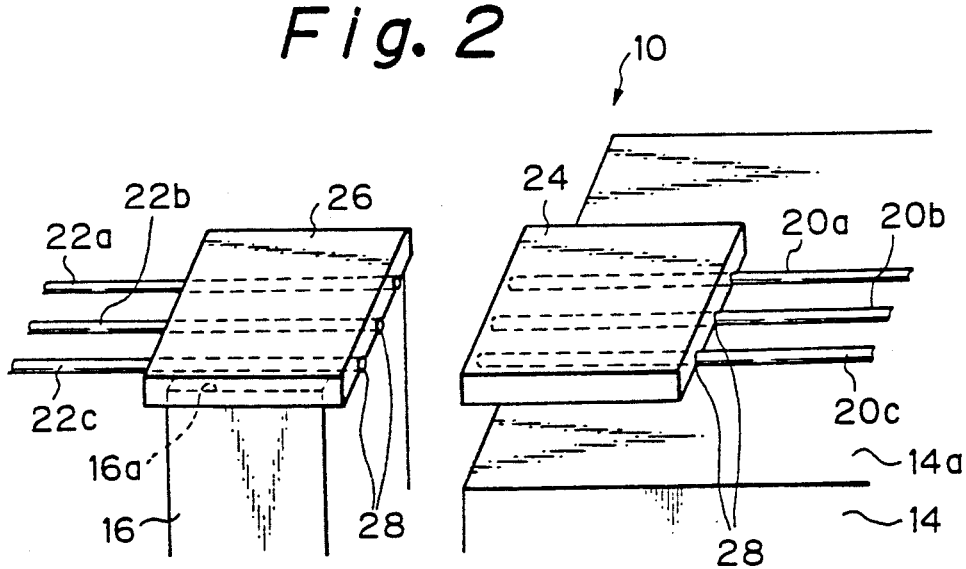
FIG. 2 is a partially enlarged view of FIG. 1.

FIGS. 1 and 2 show the optical switch 10 according to the first embodiment of the present invention. The optical switch 10 comprises a base 12, a stationary support member 14 mounted on the base 12, and a movable support member 16 also mounted on the base 12. The stationary support member 14 and the movable support member 16 are arranged side by side with a small vertical gap therebetween, and have respective top surfaces 14a and 16a which are flat and flush with each other. The movable support member 16 is movable in the direction of the arrow A so that end surfaces of optical fibers on the stationary and movable support members 14 and 16 are maintained in a parallel relationship. Stoppers 18 are arranged on either side of the movable support member 16, to precisely locate the movable support member 16 between the two positions.

Figure 7:
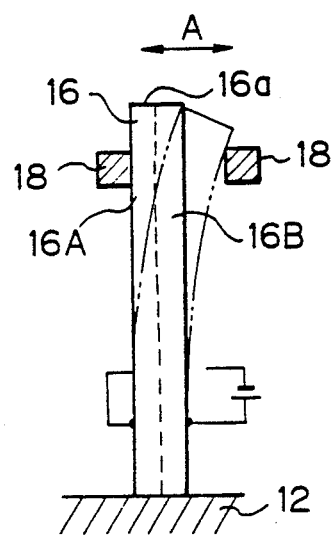
FIG. 7 is a view of the movable support member.

The movable support member 16 comprises a piezoelectric actuator. More particularly, the movable support member 16 comprises a piezoelectric actuator having a bimorph structure. As shown in FIG. 7, the movable support member 16 having a bimorph structure comprises two layers 16A and 16B having anti-polarity ferroelectric domain, respectively, and attached back to back, and bending in the direction of the arrow A in a cantilevered fashion when a voltage is applied between electrodes on the outer surfaces of the layers 16A and 16B, as shown by the semi-dash line. Preferably the movable support member 16 is made of lithium niobate crystal, since such a two-layered bimorph structure can be obtained in a single piece of lithium niobate crystal, by an adequate thermal processing thereof.

Figure 8:
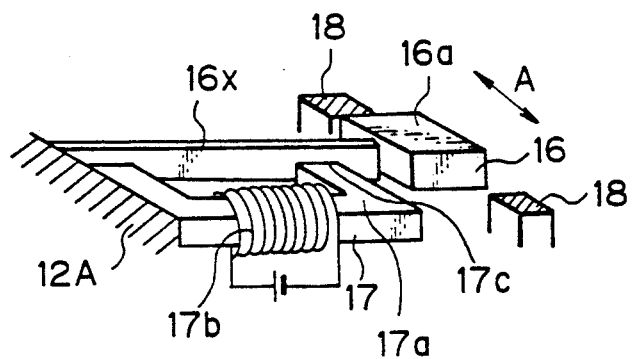
FIG. 8 is a view of another example of the movable support member.

FIG. 8 shows another example of the movable support member 16, which is operated by a solenoid 17. The movable support member 16 is carried by a flexible metal bar 16x fixed to a base 12A. The solenoid 17 comprises a core 17a, and a coil 17b wound around the core 17a. One end 17c of the core 17a extends toward the flexible bar 16x, and thus the flexible metal bar 16x is pulled toward the core 17a when the voltage is applied to the coil 17b, and returned to the initial position when the voltage is not applied. Accordingly, the movable support member 16 can move in the direction of the arrow A. The movable support member 16 has a top flat surface 16a for supporting optical fibers and a cover (not shown) may be provided over the flexible metal bar 16x and the solenoid 17.

In FIGS. 1 and 2, at least one pair of optical fibers 20 and 22 (three pairs of optical fibers 20a-22a, 20b-22b, and 20c-22c in this embodiment) are carried in an alignment with each other on the respective top surfaces 14a and 16a of the stationary support member 14 and the movable support member 16, and end surfaces of pairs of the optical fibers face each other with a small gap therebetween. A first guide 24 covers the optical fibers 20a-20c carried by the stationary support member 14 to fix the optical fibers 20a-20c to the stationary support member 14. A second guide 26 covers the optical fibers 22a-22c carried by the movable support member 16, to fix the optical fibers 22a-22c to the movable support member 16. An adhesive can be used for this fixing. As shown, V-shaped grooves 28 are provided in the surfaces of the first and second guides 24 and 26, so that the optical fibers 20a-20c and 22a-22c are first inserted in the V-shaped grooves 28 and fixed thereto, and the first and second guides 24 and 26 are inverted when positioned on the stationary and movable support members 14 and 16.

Figure 3A:
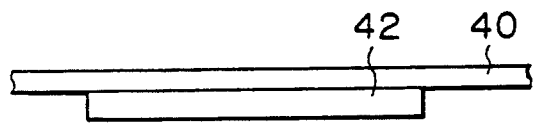
FIGS. 3A to 3D are views illustrating steps of fabricating the optical switch of FIG. 1.
Figure 5:
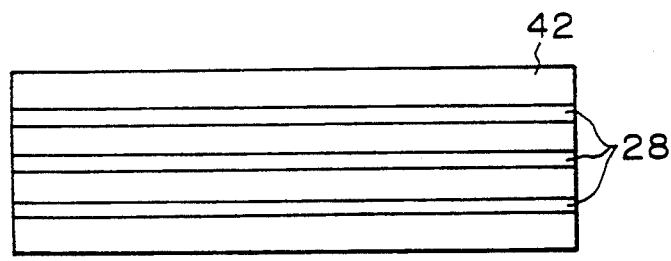
FIG. 5 is a plan view of the guide of FIG. 4.
Figure 6:
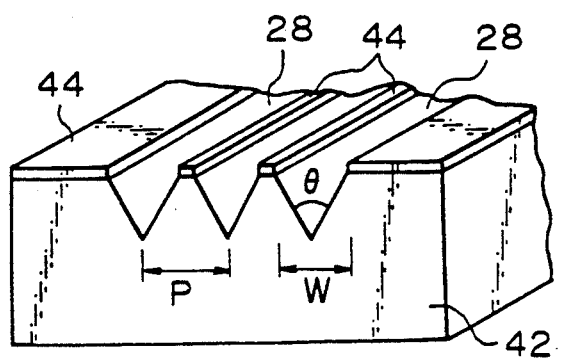
FIG. 6 is a view illustrating the preparation of the guide.

FIGS. 3A to 3D show the steps of fabricating the optical switch 10 of the present invention. As shown in FIG. 3A, an optical fiber element (or optical fiber elements) 40 is secured to a surface of a guide 42 having a straight axis. In this step, the guide 42, which has straight V-shaped grooves 28 in one surface thereof, is used, as shown in FIGS. 5 and 6, and the optical fiber element 40 is inserted in each of the V-shaped grooves 28 and fixed thereto by an adhesive. In this example, three V-shaped grooves 28 are provided in parallel to each other in the guide 42, to carry three pairs of optical fibers, as shown in FIGS. 1 and 2.

Typically, for an optical fiber having a 125 μm-diameter clad, the width W (FIG. 6) of the opening of the V-shaped groove 28 is approximately 150 μm, the pitch P between the adjacent grooves 28 approximately 100 μm, the depth approximately 170 μm, and the angle θ of the bottom of the V approximately 70 degrees. Such a guide 42 having V-shaped grooves 28 is obtained by etching a silicon crystal plate, as shown in FIG. 6. The surface of the silicon crystal plate is at (100) plane and masks 44 are arranged in the direction of <011>. Then an anisotropic solution composed of ethylene diamine, pyrocatechol and water is used. By this etching, straight and regular angled V-shaped grooves 28 are formed in a silicon crystal plate in accordance with anistopy of the silicon. Accordingly, preferably a silicon crystal plate is used for the guide 42 of the present invention.

Figure 3B:
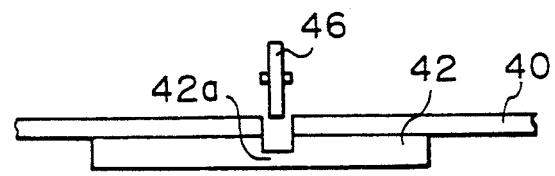
Figure 3C:
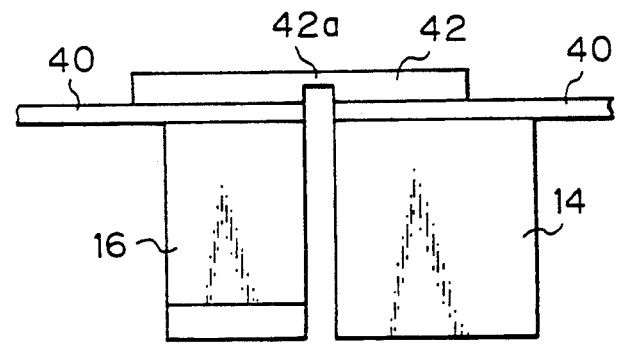
Figure 4:
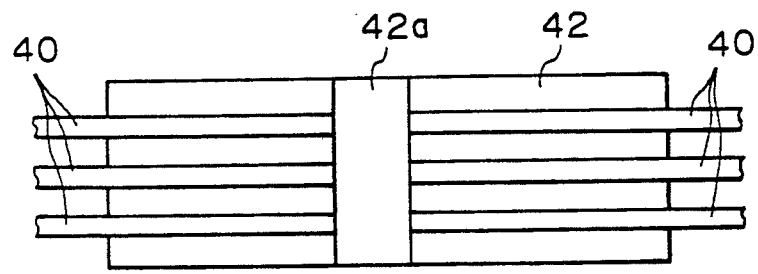
FIG. 4 is an enlarged view of FIG. 3B.

Next, as shown in FIG. 3B, the guide 42 with the optical fiber element 40 is cut with a dicing saw 46 (at a cutting width of 50 μm), along a line or a plane to be located between the stationary and movable support members 14 and 16. In this step, however, the optical fiber element 40 is completely cut but the guide 42 is partly cut, i.e., a portion 42a of the guide 42 remote from the grooved surface remains uncut (also refer to FIG. 4). Next, as shown in FIG. 3C, the guide 42 is bridged between the stationary and movable support members 14 and 16 so that the portion 42a remained uncut at the initial cutting step is located in the gap between the stationary and movable support members 14 and 16, and the guide 42 is fixed to the stationary and movable support members 14 and 16 by an adhesive. Preferably, in this step, the guide 42 is inverted from the position of FIG. 3B, so that the optical fiber element 40 (which is cut into two pieces) is in direct contact with the stationary and movable support members 14 and 16, and the portion 42a remaining uncut at the initial cutting step is located on the side of the top surface at that stage. The top surface of the guide 42 is positioned in parallel to the surfaces of the stationary and movable support members 14 and 16, for example, by a parallel adjusting with a laser beam applied to the top surface of the guide 42 to sense the reflected beam, and thereafter, the guide 42 is fixed to the stationary and movable support members 14 and 16.

Figure 3D:
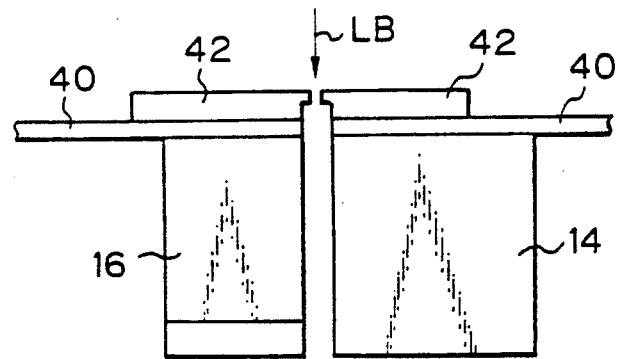

Next, as shown in FIG. 3D, the portion 42a of the guide 42 remaining uncut at the initial cutting step is cut by a YAG laser beam (LB). This final cut by the laser beam is carried out easily and reliably, since the portion 42a is on the top surface side. In this way, the optical fiber element 40 and the guide 42 are completely separated into two parts, i.e., a pair of optical fibers 20 and 22 and the first and second guides 24 and 26 in FIG. 1, and the optical switch 10 shown in FIGS. 1 and 2 is obtained. In this embodiment, it is possible to initially cut the optical fiber element 40 and a portion of the guide 42 by a relatively large force, and finally cut the portion 42a remaining uncut at the initial cutting step by a relatively small force, after fixing the optical fiber element 40 and the guide 42 to the stationary and movable support members 14 and 16. Accordingly, the final cut does not induce damage or an offset of the optical fiber element 40, relative to the stationary and movable support members 14 and 16. Also, it has been observed that cut surfaces of the optical fiber element 40 at the initial cutting by the dicing saw 46 are smooth.

Figure 9:
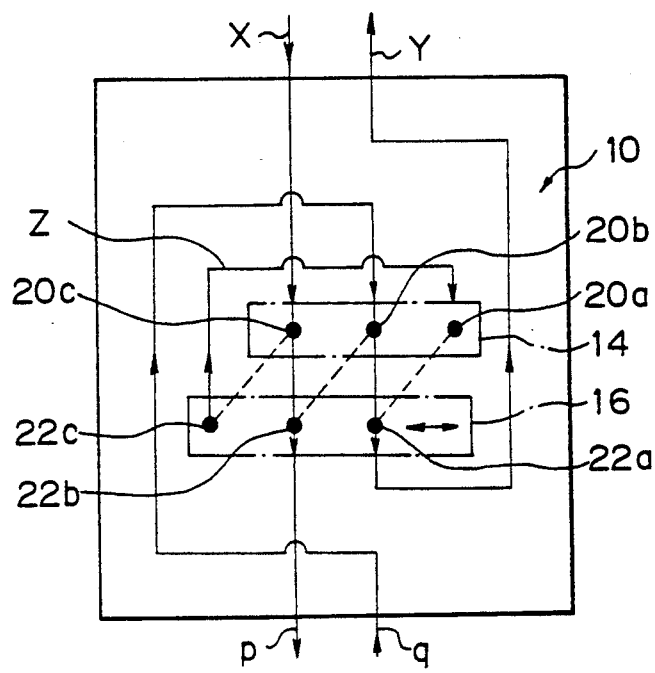
FIG. 9 is a view illustrating an example of the use of the optical switch of FIG. 1.
Figure 10:
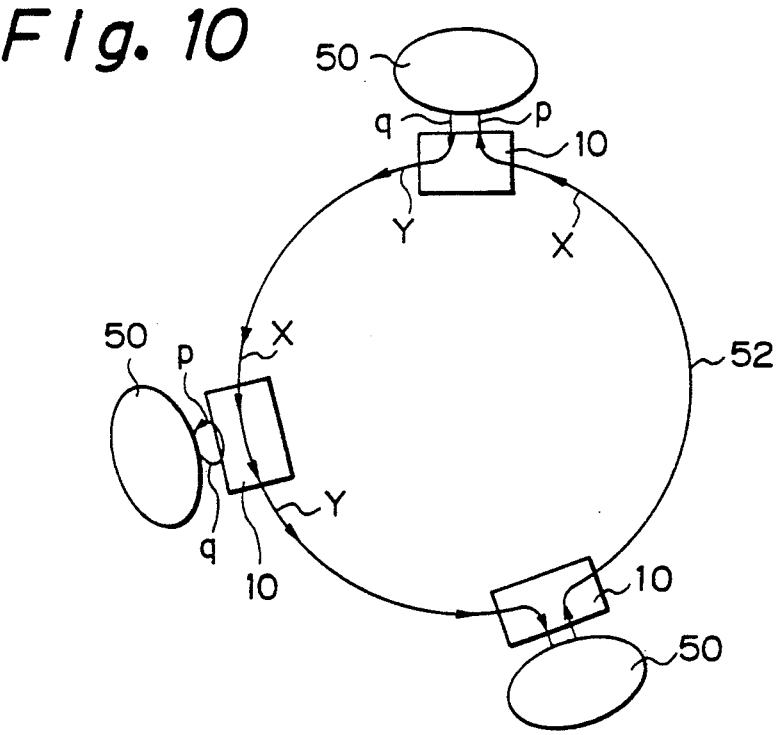
FIG. 10 is a view of a ring-like optical LAN using the optical switch of FIG. 9.

The optical switch 10 shown in FIGS. 1 and 2 can be used, for example, in a manner as shown in FIGS. 9 and 10. FIG. 9 shows an example of the use of the optical switch 10, and FIG. 10 shows a ring-like optical LAN (local area network) using the optical switch 10. For example, the LAN has three work stations 50 interconnected by a main line 52 and the optical switch 10 is arranged between the main line 52 and each of the work stations 50. The lines of the main line 52 at the juncture with each of the work stations 50 are shown by X and Y, and the lines of each of the work stations 50 are shown by p and q. In FIG. 10, the top optical switch 10 shows a condition in which the lines X and p and Y and q are connected to each other, respectively, so that a signal is communicated between the main line 52 and the top work station 50. The left optical switch 10 shows a condition in which the lines X and p and Y and q are disconnected from each other, and the lines X and Y and p and q are connected to each other, respectively so that the left work station 50 is isolated from the main line 52. Therefore, the main line 52 and the other work stations 50 are not affected if an abnormality occurs at the left work station 50.

In FIG. 9, the movable support member 16 has been moved to the left, so that the initially facing optical fibers 20a-22a, 20b-22b, and 20c-22c are out of alignment, and the initially adjacent optical fibers 20b-22a, and 20c-22b are brought into alignment, whereby the lines X and p and Y and q are connected to each other, respectively, similar to the condition of the top optical switch 10 in FIG. 10. When the movable support member 16 is moved back to the right, the corresponding optical fibers 20a-22a, 20b-22b, and 20c-22c are brought into alignment, as shown by the broken line, and the lines X and p and Y and q are disconnected from each other, and the lines X and Y and p and q are connected to each other, respectively, similar to the left optical switch 10 in FIG. 10. Thus, according to the present invention, it is possible to easily fabricate an optical switch 10 having a plurality of pairs of optical fibers.

Figure 11:
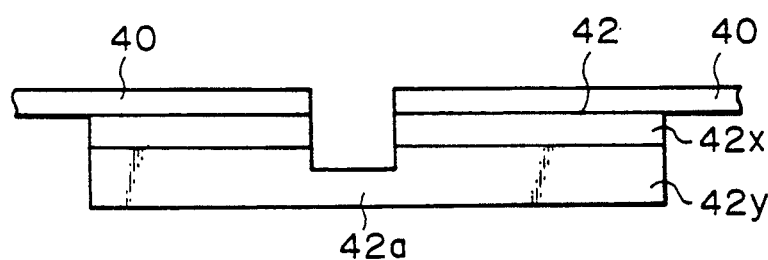
FIG. 11 is a view of an optical switch according to the second embodiment of the present invention.
Figure 12:
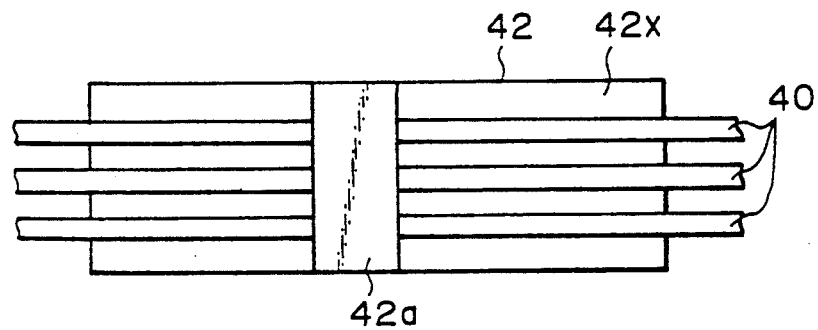
FIG. 12 is a plan view of FIG. 11.

FIGS. 11 and 12 show the second embodiment of the present invention. The optical switch 10 of the second embodiment can be fabricated in accordance with the steps described with reference to FIGS. 3A to 3D, but the second embodiment is featured by the construction of the guide 42 and the separating step thereof. The guide 42 used in FIGS. 3A to 3D is made from a silicon crystal plate, but the guide 42 in FIGS. 11 and 12 comprises a first silicon crystal plate 42x and a second plate 42 attached to the first silicon crystal plate 42x and made from a material which is easier to cut than a material of the first silicon crystal plate 42x. The first silicon crystal plate 42x has V-shaped grooves 28, similar to those of FIGS. 5 and 6. The easily cuttable second plate 42 is selected from a material which can be easily cut by a laser, such as ceramics, lithium tantalate and lithium niobate; the latter two being transparent and easily positionable.

After preparing such a guide 42, the optical fiber element 40 is secured to the surface of the guide 42, as shown in FIG. 3A, and then the guide 42 with the optical fiber element 40 is cut by the dicing saw 46, as shown in FIG. 3B, so that the first silicon crystal plate 42x and the optical fiber element 40 are substantially completely cut but at least a portion 42a of the second guide plate 42y remains uncut. Then the guide 42 is inverted, as shown in FIG. 3C, and the guide 42 is bridged between the stationary and the movable support members 14 and 16 and fixed to the stationary and the movable support members 14 and 16. Thereafter, as shown in FIG. 3D, the portion 42a of the guide 42 remaining uncut at the initial cutting step is cut by a YAG laser beam. Since the first silicon crystal plate 42x is cut at the initial cutting, the final cut is only for the portion 42a of the second guide plate 42y, which can be easily cut. Therefore, it is possible to cut the portion 42a with a laser having a relatively small energy.

Figure 13A:
FIGS. 13A to 13C are views illustrating steps of fabricating an optical switch according to the third embodiment of the present invention.
Figure 13B:
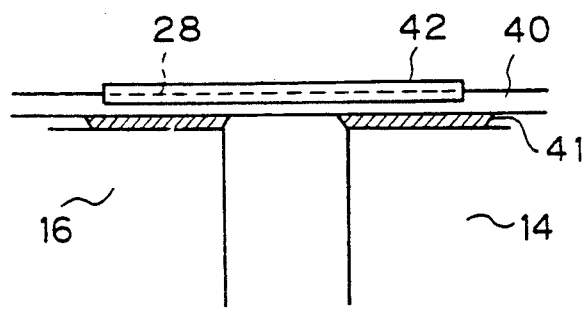
Figure 13C:
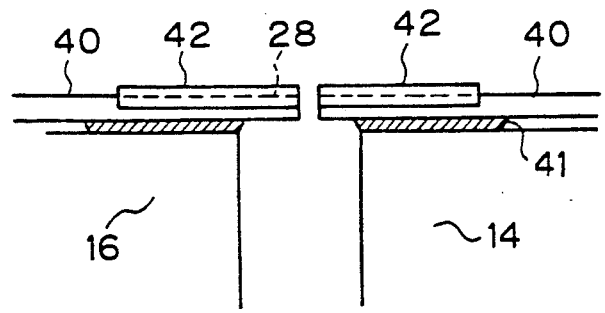
Figure 14:
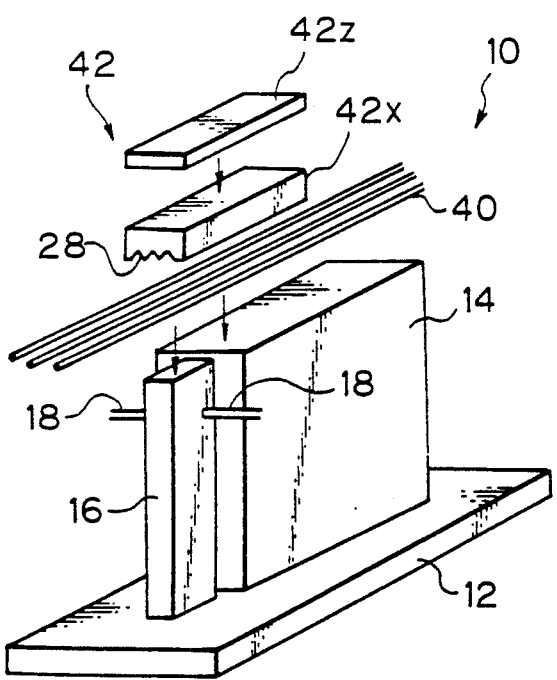
FIG. 14 is an exploded perspective view of an optical switch according to the fourth embodiment of the present invention.

FIGS. 13A to 13C show the third embodiment of the present invention. Initially, V-shaped grooves 28 are provided in the surface of a guide 42, and thereafter, as shown in FIG. 13A, an optical fiber element 40 is fixed in each of the V-shaped grooves 28. Then, as shown in FIG. 13B, the guide 42 is bridged between the stationary and movable support members 14 and 16 and the guide 42 is fixed to the stationary and movable support members 14 and 16 by an adhesive 41, and as shown in FIG. 13C, the guide 42 with the optical fiber element 40 is then completely cut by a dicing saw along a line or a plane to be located between the stationary and movable support members 14 and 16, whereby the optical fiber element 40 and the guide 42 are completely separated to constitute the optical switch 10 of the present invention.

Figure 15A:
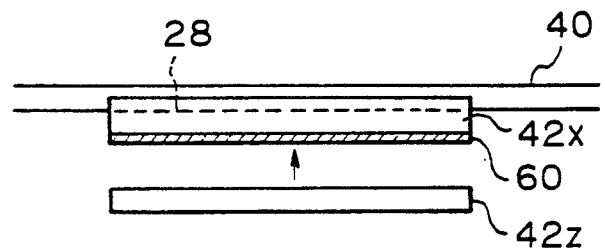
FIGS. 15A to 15D are views illustrating steps of fabricating the optical switch of FIG. 14.

FIGS. 14 and 15A to 15D show the fourth embodiment of the present invention. In this embodiment, the guide 42 comprises a first guide plate 42x made from silicon crystal and having V-shaped grooves 28, and a second guide plate 42z. The second guide plate 42z comprises a silicon plate or a glass plate and is attached to the first guide plate 42x by a soluble hardening agent 60 (FIG. 15A). Then, an optical fiber element 40 is secured to each of the V-shaped grooves 28. Note, it is possible to attach the second guide plate 42z to the first guide plate 42x after the optical fiber element 40 is secured to the first guide plate 42x. The soluble hardening agent 60 comprises a water soluble-hardening agent which is hardened (to show an adhesive property) by ultraviolet light, and is dissolved by water. Such a soluble hardening agent 60 is commercially available, for example, as CHEMISEAL U-451 by K. K. Chemitek. The second guide plate 42z is preferably transparent to ultraviolet light.

Figure 15B:
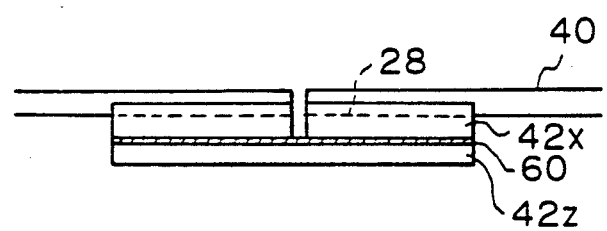
Figure 15C:
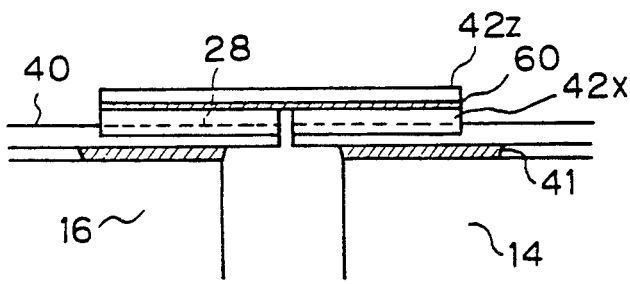
Figure 15D:
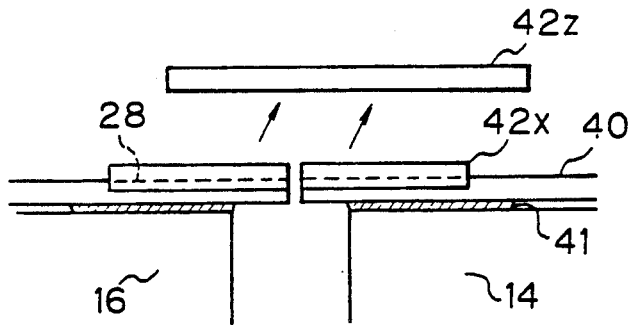

As shown in FIG. 15B, the guide 42 with the optical fiber element 40 is cut by a dicing saw, so that the first silicon crystal plate 42x and the optical fiber element are substantially completely cut but the second guide plate 42z is not substantially cut. Then, as shown in FIG. 15D, the guide 42 is bridged between the stationary and movable support members 14 and 16 and fixed thereto by an adhesive 41 which isn't dissolved by liquid, and the guide 42 is then separated by removing the second guide plate 42z by applying liquid to the soluble hardening agent 60, to dissolve the soluble hardening agent 60, whereby the optical fiber element 40 and the guide 42 are completely separated to constitute the optical switch 10 of the present invention.

What is claimed is:

1. A method of fabricating an optical switch including a stationary support member, a movable support member, and at least one pair of optical fibers having end surfaces, respectively, one of the optical fibers being supported on said stationary support member and the other of said optical fibers being supported on said movable support member so that the respective one end surfaces of said optical fibers face each other to form an optical path therebetween and the optical path between the optical fibers is changed by moving said movable support member relative to said stationary support member, said method comprising the steps of:

preparing guide means having a straight axis and a surface extending in parallel to said axis;

securing at least one optical fiber element on the surface of said guide means;

bridging said guide means between said stationary and movable support members and fixing said guide means on said stationary and movable support members; and separating said guide means along at least a line extending between said stationary and movable support members so that said optical fiber element is separated along said line into a first part supported by said stationary support member and a second part supported by said movable support member, said first and second parts of said separated optical fiber element constituting said at least one pair of optical fibers having the respective end surfaces thereof facing each other.

2. A method according to claim 1, wherein the step of preparing said guide means includes forming at least one V-shaped straight groove on said surface of said guide means, and said optical fiber element is secured in said V-shaped groove.

3. A method according to claim 2, wherein said at least one V-shaped groove comprises a plurality of V-shaped grooves arranged in parallel to each other, and said at least one pair of optical fibers are a plurality of pairs of optical fibers.

4. A method according to claim 2, wherein said guide means is made from a silicon plate, and said forming of at least one V-shaped groove is carried out by an etching process.

5. A method according to claim 2, wherein said separating said guide means comprises cutting said guide means and said optical fiber element after said guide means is bridged and fixed on said stationary and movable support members.

6. A method according to claim 2, further including the step of partly cutting said guide means along said line on the side of said surface of said guide means so that said optical fiber element is completely cut but a portion of said guide means remote from said surface remains uncut, after the step of securing said at least one optical fiber element on said surface of said guide means and before the step of bridging said guide means between said stationary and movable support members, and wherein the step of said separating said guide means comprises separating the uncut portion of said guide means along said line.

7. A method according to claim 6, wherein said cutting is carried out by a dicing saw.

8. A method according to claim 6, wherein said separating of said guide means is carried out by a laser cutting.

9. A method according to claim 6, wherein the step of preparing said guide means includes preparing a first guide plate having first and second surfaces and at least one V-shaped straight groove on said first surface thereof, and a second guide plate having first and second surfaces with said first surface of said second guide plate attached to said second surface of said first guide plate, said at least one optical fiber element being secured in said at least one V-shaped groove.

10. A method according to claim 9, wherein the step of partly cutting said guide means along said line is carried out so that said first guide plate and said optical fiber element are generally completely cut but at least a portion of said second guide plate remains uncut.

11. A method according to claim 9, wherein said second guide plate is made from a material which is easier to cut than a material of said first guide plate.

12. A method according to claim 11, wherein said second guide plate is made from silicon, and said first guide plate is made from one of ceramics, lithium tantalate and lithium niobate.

13. A method according to claim 9, wherein said second guide plate is attached to said first guide plate by a soluble hardening agent, the step of partly cutting said guide means along said line is carried out so that said first guide plate and said optical fiber element are generally completely cut but said second guide plate remains substantially uncut, and the step of said separating the guide means along said line is carried out by applying a liquid to said second guide plate to dissolve said soluble hardening agent, to thereby allow said second guide plate to be separated from said first guide plate fixed to said stationary and movable support members.

14. A method according to claim 1, wherein said movable support member comprises a piezoelectric member.

15. A method according to claim 14, wherein said movable support member comprises a piezoelectric member having a bimorph structure.

16. A method according to claim 15, wherein said movable support member comprises a piezoelectric member having a bimorph structure made from lithium niobate crystal.

17. A method according to claim 1, wherein said movable support member comprises a solenoid operated member.

* * * * *